(No Model.)

E. EGGLESTON.
BOOK COVER FOR EDUCATIONAL PURPOSES.

No. 428,899. Patented May 27, 1890

Attest:
A. N. Jesbera
E. M. Watson

Inventor:
Edward Eggleston
By David A. Burr
Atty.

UNITED STATES PATENT OFFICE.

EDWARD EGGLESTON, OF QUEENSBURY, NEW YORK.

BOOK-COVER FOR EDUCATIONAL PURPOSES.

SPECIFICATION forming part of Letters Patent No. 428,899, dated May 27, 1890.

Application filed September 7, 1889. Serial No. 323,315. (No model.)

*To all whom it may concern:*

Be it known that I, EDWARD EGGLESTON, of the town of Queensbury, in the county of Warren and State of New York, have invented a new and useful Improvement in Covers for Books for Educational Purposes; and I do hereby declare that the following is a full and exact description thereof, reference being had to the accompanying drawings, and to the letters of reference marked thereon, making a part of this specification.

My invention relates to an improvement in covers for educational works relating to geography, history, travels, &c.

It has for its object to provide a cover for books of this class which shall present upon its outer face a graphic delineation in relief of the principal physical features of the country to which the book relates, and thereby attract and excite the interest of the student and facilitate the acquirement of facts in relation to the subject depicted.

It consists in the book-cover constructed with a facing-sheet of paper properly secured thereto to become integral therewith, and which is embossed to present in relief upon its obverse side and in cameo upon its reverse side a map depicting the elevations and depressions of the land in their proper relations above the sea-level, as represented by the plain flat portion of the sheet.

Figure 1:
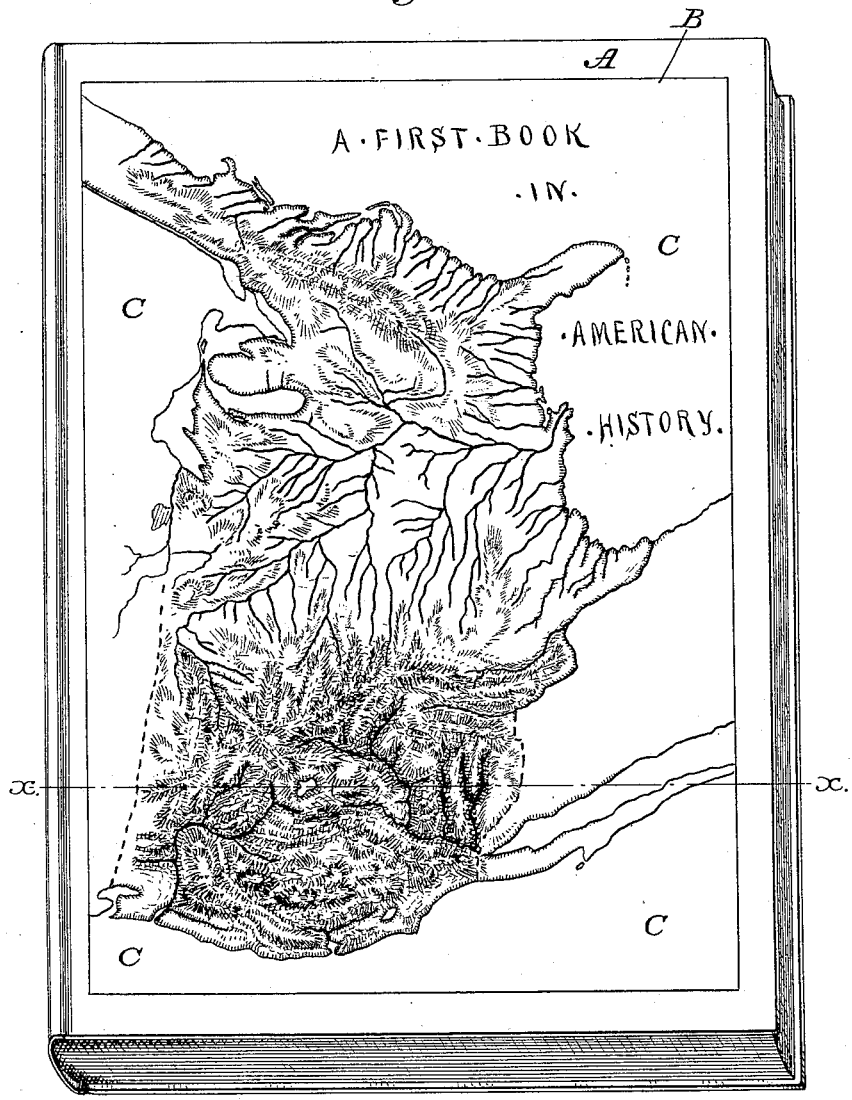
Figure 2:

In the accompanying drawings, Figure 1 is a view in perspective of a book whose cover is constructed according to my invention with a raised map upon its outer face, and Fig. 2 is a transverse section in line *x x* of Fig. 1.

A represents the usual stiff pasteboard constituting the body of the cover. This cover is bound with the book to form an outer face and protecting-piece therefor in the customary manner.

B is the separate embossed sheet, representing in bas-relief upon its outer face the elevations and surface undulations of a country. The relief is formed by stamping or compressing a sheet of heavy paper between male and female dies, so that each elevation on the face forms a counterpart depression on the under side of the sheet, as shown in Fig. 2.

The marginal flat portion C of the paper sheet denoting the sea-level, and which surrounds the portion in relief, furnishes the required surface by which an attachment of the embossed sheet to the cover is effected, this flat margin C being pasted down upon the surface of the cover, so as to be firmly united thereto.

The combined raised map and book-cover furnishes a very neat and striking finish to the book, and in connection with the appropriate letter-press therein forms a unique and instructive auxiliary thereto, especially adapted to the education of the young in matters of physical geography and of history.

I do not claim, broadly, a map formed in relief, as such a device in various forms is well known to the art. My invention differs from the devices of this character heretofore known, in that it involves the application of a sheet of paper embossed to form the relief-map to the cover of a book, to constitute an integral part thereof as a facing therefor.

I claim as my invention—

The combination, with the cover of a book, of an outer facing-sheet of paper embossed to present a map formed in relief upon its outer and in cameo upon its inner side and permanently united to the cover, to be protected thereby and constitute an integral portion thereof, substantially in the manner and for the purpose herein set forth.

In testimony whereof I have signed my name to this specification in the presence of two subscribing witnesses.

EDWD. EGGLESTON.

ELWIN SEELYE,
MABEL COOKE.